Nov. 23, 1937.                S. A. MOREHOUSE                2,100,059
                               CONTROL SYSTEM
                             Filed July 22, 1935          3 Sheets-Sheet 1
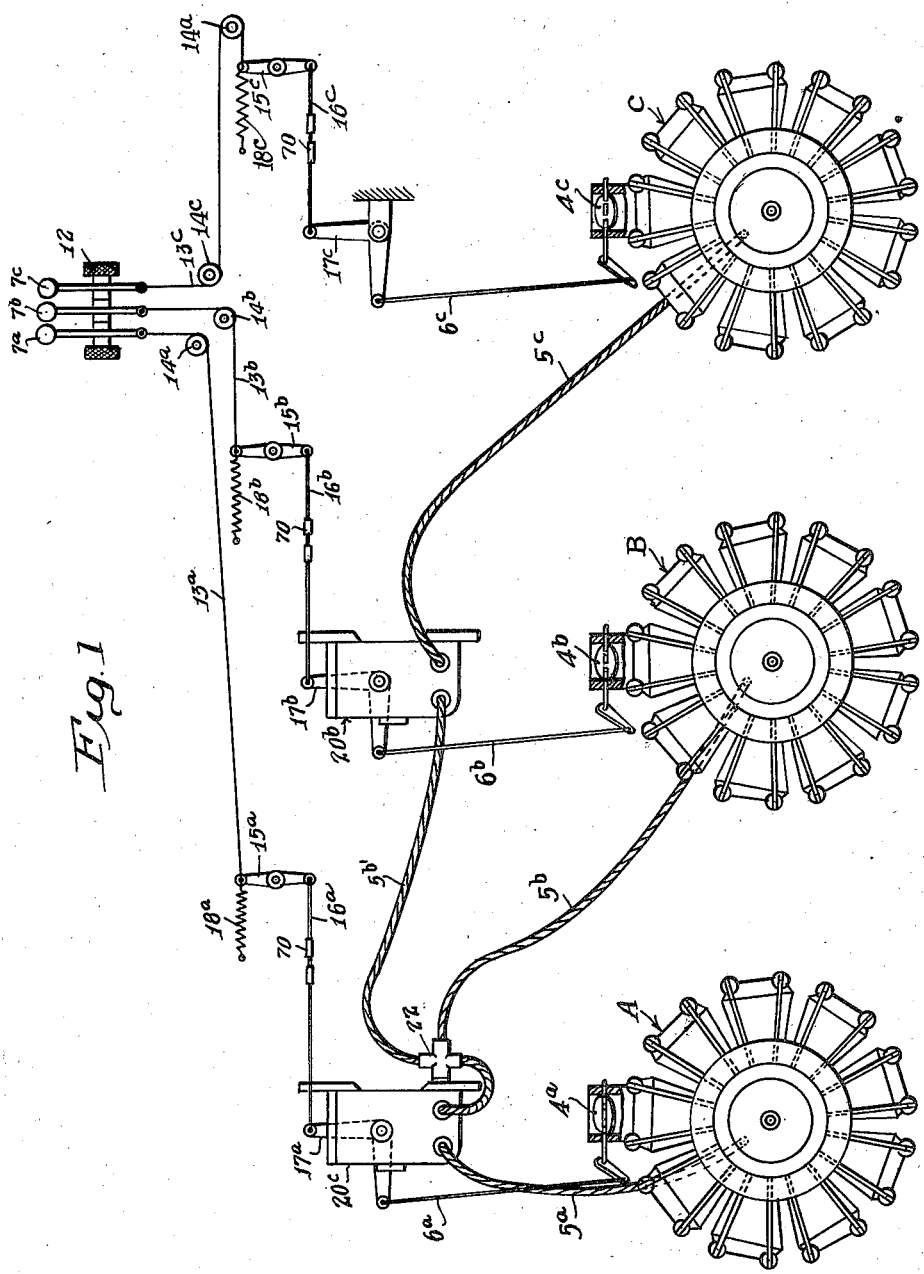
INVENTOR.
Silas A. Morehouse
BY Lyon & Lyon
ATTORNEYS

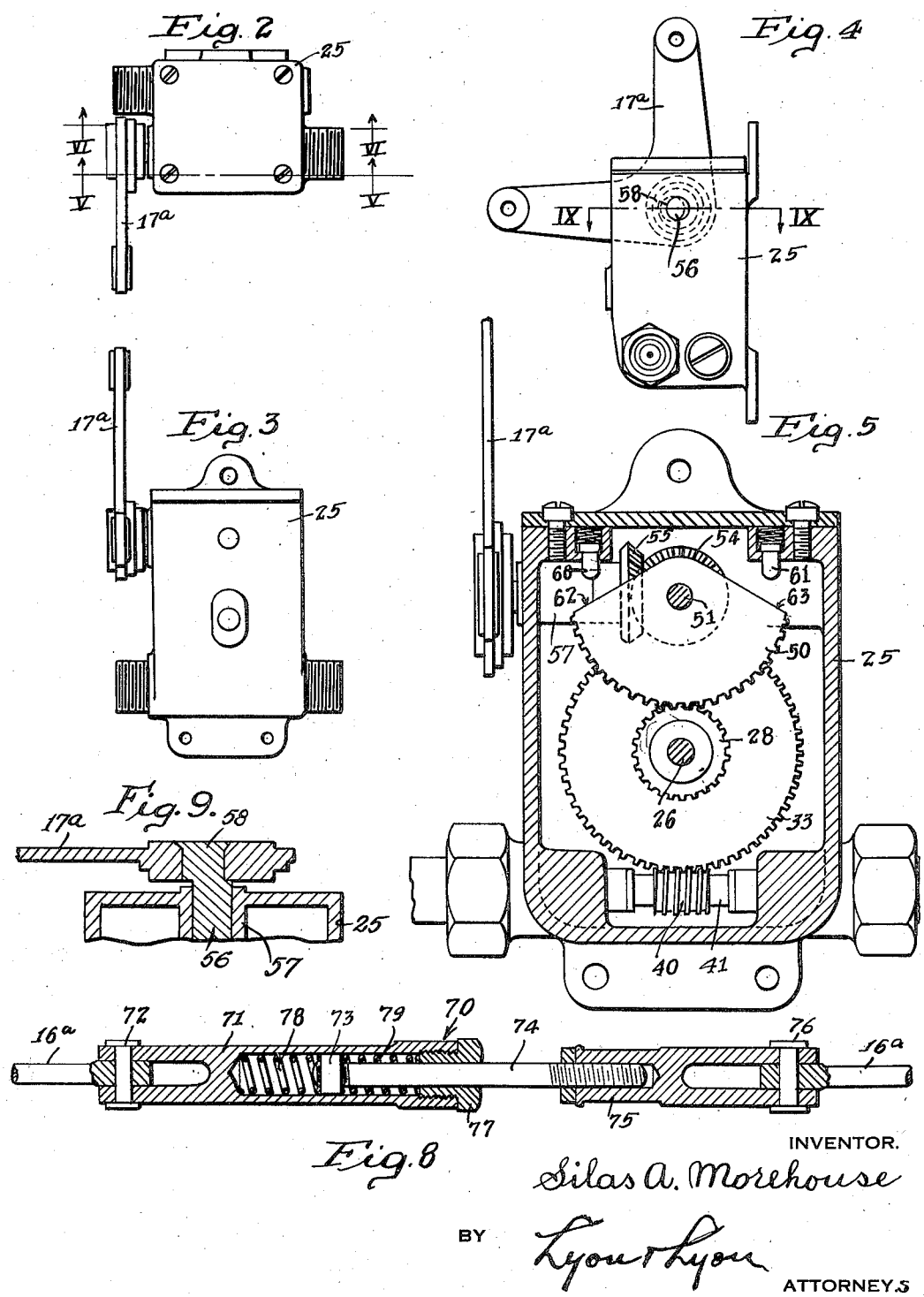

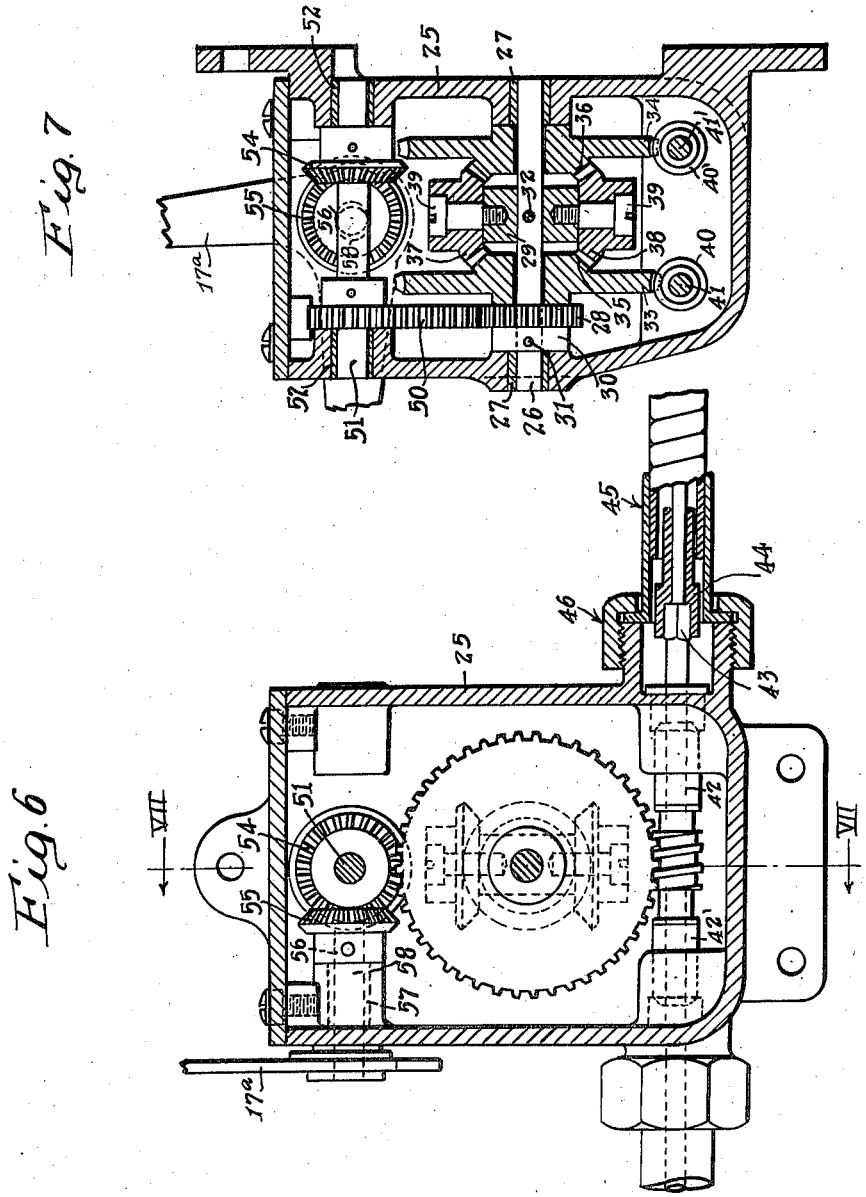

Patented Nov. 23, 1937

2,100,059

UNITED STATES PATENT OFFICE 2,100,059

CONTROL SYSTEM

Silas A. Morehouse, Glendale, Calif., assignor to Rocky Mountain Steel Products, Inc., Los Angeles, Calif., a corporation of California Application July 22, 1935, Serial No. 32,575

7 Claims. (Cl. 60—97)

This invention relates broadly to control systems for automatically maintaining two or more rotating devices at predetermined relative speeds and is particularly applicable to the control of engines in multi-engine airplanes, motor boats, and the like where the different engines are not connected to a common shaft but nevertheless should run at the same speed.

An object of the invention is to provide a practicable mechanism for maintaining a plurality of engines in a predetermined desired speed relation.

A more specific object is to provide a mechanism of the type referred to which can be applied to airplanes, motor boats and the like and does not change the normal control or necessitate any attention on the part of the operator.

Various more specific objects, features and advantages of the invention will be apparent from the following detailed description which refers to the drawings.

The system of the present invention has been designed for and successfully employed on airplanes and for that reason the specific application of the invention to an airplane will be described.

In the drawings:

Fig. 1 is a schematic diagram illustrating the application of the invention to the three engines of a tri-motor airplane;

Fig. 2 is a plan view of a preferred form of synchronizing unit in accordance with the invention;

Figs. 3 and 4 are side and end views, respectively, of the device shown in Fig. 2;

Fig. 5 is a cross section through the mechanism shown in Fig. 2, the section being taken in the plane V—V of Fig. 2;

Fig. 6 is a cross section through the device shown in Fig. 2, the section being taken in the plane VI—VI of Fig. 2;

Fig. 7 is a sectional view taken at right angles to the section of Fig. 6 in the plane VII—VII of Fig. 6; and Fig. 8 is a detail view of a safety link adapted to be inserted in the linkage employed with my unit.

Fig. 9 is a detailed section in the plane IX—IX of Fig. 4.

Referring to Fig. 1, I have shown schematically three airplane engines A, B, and C, respectively, all three of which are substantially identical and each of which is provided with throttle valves 4a, 4b, and 4c, respectively, which control the supply of fuel to the engines, the speed of each engine being controlled by adjustment of the throttle valve. Each of the engines A, B, and C also has extending therefrom tachometer shafts 5a, 5b, and 5c, respectively, which are merely flexible shafts connected to the rotary elements of the associated engines and adapted to rotate at all times in synchronism therewith. The throttle valves 4a, 4b, and 4c are provided with control rods 6a, 6b, and 6c, respectively, for opening and closing them, and other elements next to be described are employed for coupling each of the rods 6a, 6b, and 6c to one of three throttle control levers 7a, 7b, and 7c, respectively, throttle 7a controlling engine A, throttle 7b controlling engine B, and throttle 7c controlling engine C. The three throttles 7a, 7b, and 7c are, as is customary in airplane construction, positioned close together so that the operator can shift all three of them simultaneously if desired by grasping them all at once or he can shift them independently. A screw knob 12 is provided for locking the three throttles 7a, 7b, and 7c in any desired position to which they may have been moved.

As shown in Fig. 1, throttle 7a which controls engine A is connected by a cable 13a passing over a pulley 14a, a lever 15a, a control rod 16a and a bell crank lever 17a to the rod 6a associated with engine A so that movement of the throttle 7a is positively transmitted to the rod 6a. A spring 18a may be provided to maintain the cable 13a taut.

Throttle 7b is similarly connected by a cable 13b passing over a pulley 14b, a lever 15b, a rod 16b and a bell crank lever 17b to the throttle rod 6b associated with the engine B. Throttle 7c is likewise similarly connected by a cable 13c passing over a pulley 14c, a lever 15c, a rod 16c and a bell crank lever 17c with the throttle rod 6c associated with engine C.

The bell crank lever 17c has a fixed fulcrum so that the throttle valve 4c is positively and solely responsive to movements of the throttle 7c associated with that engine. Engine C therefore functions as a master engine which determines the speeds of the other engines A and B, respectively.

To automatically regulate the speeds of engines A and B with respect to each other and with respect to engine C, the fulcrums of the bell crank levers 17a and 17b are adapted to be shifted, and similar mechanisms 20a and 20b are provided for automatically shifting the fulcrums of the associated levers, the mechanisms 20a and 20b being operated from the tachometer shafts 5a, 5b, and 5c in a manner next to be described. The tachometer shaft 5b extending from engine B is connected to both mechanism 20a and mechanism 20b. Thus, as shown, shaft 5b is extended directly to a take-out 22 from which an auxiliary tachometer shaft 5b' extends to the mechanism 20b.

The construction and operation of the mechanisms 20a and 20b will be described in detail later. It will suffice to say at this point that each of the mechanisms 20a and 20b functions in response to a difference in the speeds of the two tachometer shafts connected thereto to shift the fulcrum of the associated bell crank lever 17a or 17b upwardly or downwardly to shift the associated throttle rod 6a or 6b and open or close the throttle without shifting the associated throttle 7a or 7b.

Referring now to Figs. 2 to 7, inclusive, each of the units 20a and 20b comprises a casing 25 having rotatably mounted therewithin a shaft 26. Thus as shown, shaft 26 is mounted in bearing bushings 27 in opposite walls of the casing. The shaft 26 has keyed thereto a gear 28 and a differential hub 29. The gear 28 is provided with a hub 30 having a set screw 31 therein for locking it to shaft 26. The differential hub 29 likewise has a set screw 32 therein for locking it to shaft 26 after the parts have been assembled together. Rotatably mounted upon shaft 26 on opposite sides of the hub 29 are a pair of worm wheels 33 and 34, respectively, each of which has secured thereto a bevel gear 35 and 36, respectively, which bevel gears mesh with bevel gears 37 and 38, respectively, mounted for rotation about their axes on the hub 29 by screws 39, the gears 35, 36, 37, and 38 constituting a differential mechanism of well known type. The worm wheel 33 meshes with a worm 40 mounted on a shaft 41 which is rotatably supported at opposite ends in bushings 42 in the casing 25.

One end of shaft 41 projects through its associated bushing 42 and is provided with a squared end 43 adapted to engage a square socket 44 on the end of a tachometer shaft designated generically by the reference numeral 45 which may correspond to any one of the tachometer shafts 5a, 5b, 5c or 5b' shown in Fig. 1. A conventional connection 46 may be employed to secure the housing of the tachometer shaft to the casing 25.

The worm wheel 34 engages a worm 40' mounted on a shaft 41', mounted in bushings 42' in the housing 25. This shaft 41' is also provided with a squared end which projects, however, from the opposite end of the housing 25 to that from which the shaft 41 projects, this arrangement being clearly shown in Fig. 2. The purpose of bringing the shafts 41 and 41', respectively, out of the casing 25 on opposite ends thereof is to cause the worm wheels 33 and 34 to be driven in opposite directions when their associated shafts 41 and 41' are connected to tachometer shafts rotating in the same direction. It will be obvious that if the worm wheels 33 and 34 are rotated in opposite directions at equal speeds, the differential gears 37 and 38 will simply rotate about their pivot screws 39 and no rotation of hub 29 and shaft 26 will occur. However, should the wheels 33 and 34 be rotating in opposite directions at different speeds, then a differential motion will be transmitted to the shaft 26, which differential motion is used in a manner to be described to control the speeds of the engines.

The gear 28 meshes with a gear 50 locked to a shaft 51 which is rotatably mounted in bushings 52 in the housing 25. The shaft 51 also has locked thereto for rotation therewith a bevel gear 54 which meshes with a bevel gear 55 locked to a shaft 56 which is rotatably mounted and projects through a bushing 57 anchored in the wall of the casing 25, the shaft 56 having on its outer end an eccentric stub shaft 58 which constitutes the pivotal mounting for the bell crank levers 17a and 17b.

The operation of the mechanism 20a to correct a discrepancy in speed between the two motors, the tachometer shafts of which are connected to that mechanism, will now be apparent. Thus any difference in the speeds of the two tachometer shafts will cause the worm gears 33 and 34 to travel in opposite directions at different speeds which will result in a slow rotation of the differential hub 29 and shaft 26. This in turn rotates the gear 28 which rotates the gear segment 50, the latter rotating the shaft 51 and gear 54, which in turn rotates gear 55 and shaft 56 to raise or lower the eccentric stub shaft 58, thereby raising or lowering as a unit the bell crank lever 20a or 20b mounted on that unit and opening or closing the associated throttle 4a or 4b to increase or decrease the speed of the associated engine. Obviously the initial orientation of the stub shaft 58 must be such as to produce a compensating effect, i. e., close the throttle of the engine, the tachometer shaft of which is rotating at too high a speed.

Referring back to Fig. 1, it will be observed that the two worm shafts of the mechanism 20b are connected by tachometer shafts 5c and 5b and 5b', respectively, to engines C and B so that the mechanism 20b functions to bring the engine B into synchronism with engine C. Likewise the mechanism 20a has its two worm shafts connected through tachometer shafts 5b and 5a, respectively, to engines B and A, thereby functioning to bring engine A into synchronism with engine B. Obviously, if desired, engine A could be controlled directly with respect to engine C by connecting the one worm shaft of mechanism 20a to tachometer shaft 5c instead of 5b.

It is common in airplane practice to frequently, either unintentionally or intentionally, run one engine at a radically different speed from another for a period, as when testing. Therefore if special means were not provided to prevent such action, the gear segment 50 would quickly run out of mesh with the gear 28 and the device would be inoperative. To prevent such occurrence, spring stops are provided for limiting motion of the gear segment 50. These stops comprise a pair of spring detents 60 and 61, respectively, which engage the radial edges 62 and 63 of the gear segment 50 just before the latter passes out of mesh with the gear 28. This does not prevent the segment from passing out of mesh with gear 28, but resiliently urges the gear segment back into mesh so that normal driving relation between gear 28 and the segment 50 is reestablished as soon as the direction of gear 28 is reversed. However, as long as the gear 28 rotates in a direction tending to force the segment 62 against one of the stops 60 or 61, the teeth of the gear 28 merely click against the last teeth on the segment 50. The arrangement described makes it impossible to in any way damage the automatic synchronizing equipment by independently rotating one of the engines at a different speed from the others.

If the throttles 7a and 7b have a full range of motion just sufficient to completely open and close the associated throttle valves 4a and 4b when the automatic control mechanism is in neutral position, then when the latter is out of neutral position the range of motion of the associated throttle might be limited and if the operator attempted to shift the throttle to the end of its normal range severe strains would be imposed upon the linkage connecting the throttle to its associated throttle valve. To prevent such strains, I prefer to insert in each of the rods 16a and 16b a resilient lost motion device 70 which is illustrated in detail in Fig. 8. Thus it comprises a sleeve member 71 connected at one end by a clevis pin 72 to the rod 16a and adapted to receive within its hollow body a plunger 73 on the end of a rod 74, which in turn is attached by a turn buckle 75 and clevis pin 76 to the end of the other section of the rod 16a. The rod 74 passes through a bushing 77 threaded into the sleeve 71 and the plunger 73 is positioned between a pair of helical springs 78 and 79 mounted within the hollow portion of the sleeve 71, the opposite ends of the springs bearing against the inner end of the hollow portion of the body 71 and against the bushing 77, respectively. The springs 78 and 79 are sufficiently stiff to normally transmit all movement of the associated throttle 7a or 7b to the associated bell crank lever 17a or 17b while permitting lost motion and further movement of the associated throttle when the bell crank lever has reached the limit of its motion.

Although the invention has been described in detail with reference to two types of airplanes, the application of the essential principles of the invention to other multi-engine planes having any number of engines or to motor boats and other devices containing engines to be synchronized, will be obvious to those skilled in the art, and the invention is therefore to be limited only as set forth in the appended claims.

I claim:

1. In combination with two independently driven shafts to be synchronized, control means for varying the speed of one of said shafts, differential means connected to said two shafts comprising a differential member rotatable in response to a departure from a predetermined speed relation between said shafts, a rotatable driving member coupled to said differential member for rotation thereby, an oscillatable driven member in driven relation with said driving member only through a predetermined arc of oscillation of said driven member, the latter moving out of driven relation with said driving member in response to movement beyond the said arc, means operable in response to oscillation of said driven member beyond said arc for resiliently urging said driven member back into driven relation with said driving member, and means for actuating said control means in response to movement of said driven member within said arc.

2. Means as described in claim 1, in which said driven member has a segmental contact face for contacting said driving member.

3. Means as described in claim 1, in which said means for resiliently urging said driven member back into driven relation with said driving member comprises spring stop means engageable with said driven member as the latter approaches the ends of its arc of movement.

4. Means as described in claim 1, in which said driving and driven members consist of a gear and a gear segment, respectively.

5. In combination with two rotary devices to be synchronized, one of which comprises a throttle-controlled engine, a throttle therefor, differential means connected to said two devices comprising a differential member rotatable in response to a departure from a predetermined speed relation between said devices, a rotatable driving member coupled to said differential member for rotation thereby, an oscillatable driven member in driven relation with said driving member only through a predetermined arc of oscillation of said driven member, the latter moving out of driven relation with said driving member in response to oscillation of said driven member beyond said arc, means for resiliently urging said driven member back into driven relation with said driving member, control means for selectively setting said throttle at any desired opening, and means operable with said control means in any desired position for varying said throttle automatically in response to rotation of said driven member within said arc.

6. In combination with two rotary devices to be synchronized, one of which is a throttle-controlled engine, differential means coupled to said devices and comprising a shaft rotatable in response to a difference in the speeds of rotation of said devices, manual throttle control means, means connecting said control means to the throttle of said engine comprising a bell crank lever having two arms with links connecting one of said arms to said control means and connecting the other arm to said throttle, pivot means for oscillatably supporting said bell crank lever, and means for shifting said pivot means in response to rotation of said shaft.

7. Means as described in claim 6, with a resilient lost motion means incorporated in said first linkage means.

SILAS A. MOREHOUSE.